O. E. HUNT.
VEHICLE WHEEL.
APPLICATION FILED NOV. 14, 1919.

1,392,164. Patented Sept. 27, 1921.

Inventor,
Ormond E. Hunt,
By Milton Tibbetts
Atty.

UNITED STATES PATENT OFFICE.

ORMOND E. HUNT, OF DETROIT, MICHIGAN, ASSIGNOR TO PACKARD MOTOR CAR COMPANY, OF DETROIT, MICHIGAN, A CORPORATION OF MICHIGAN.

VEHICLE-WHEEL.

1,392,164.　　　　　Specification of Letters Patent.　　Patented Sept. 27, 1921.

Application filed November 14, 1919. Serial No. 337,954.

*To all whom it may concern:*

Be it known that I, ORMOND E. HUNT, a citizen of the United States, and resident of Detroit, Wayne county, State of Michigan, have invented certain new and useful Improvements in Vehicle-Wheels, of which the following is a specification.

This invention relates to motor vehicles and more particularly to the mounting of the vehicle wheels on driving axle sections.

The invention has for its object to provide a simple construction which will be made of few parts but a construction which will be firm and rigid and, moreover, a mounting constructed that the wheels may be demounted without demounting the brake drum.

Further objects will appear as the description proceeds.

Figure 1:
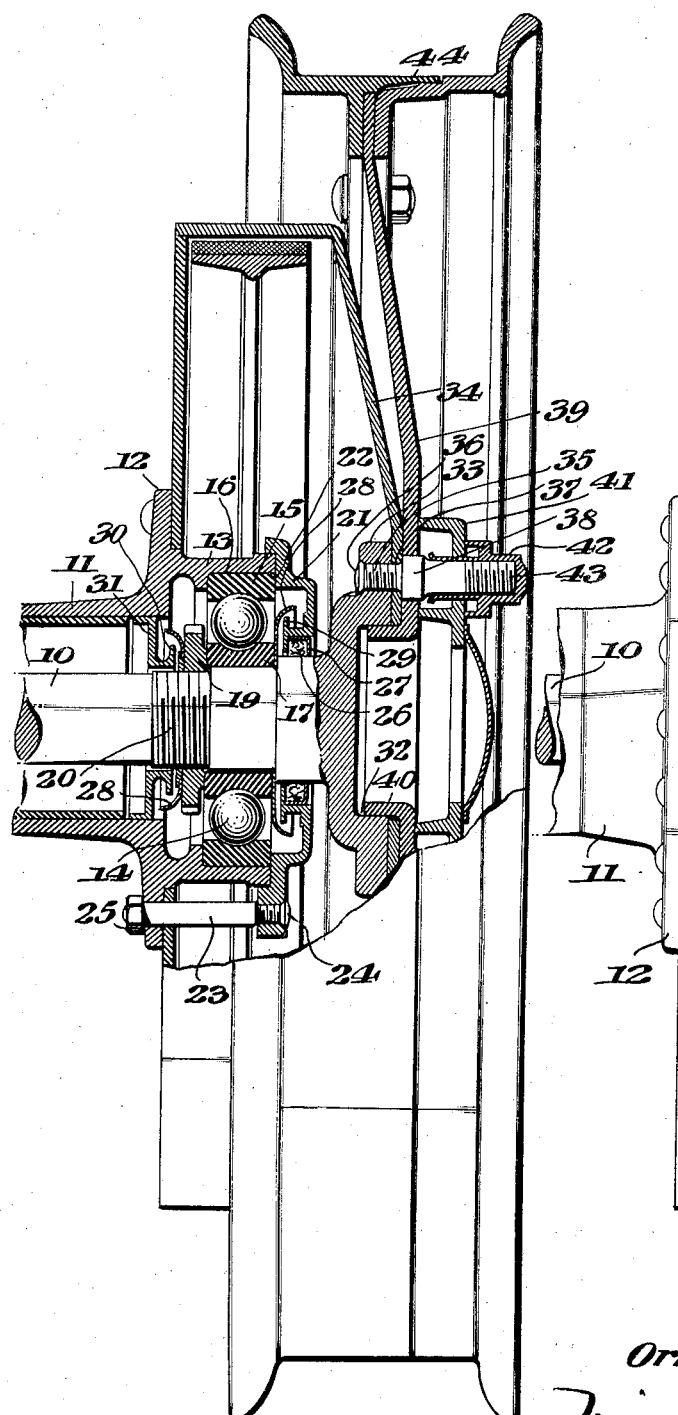
Figure 2:
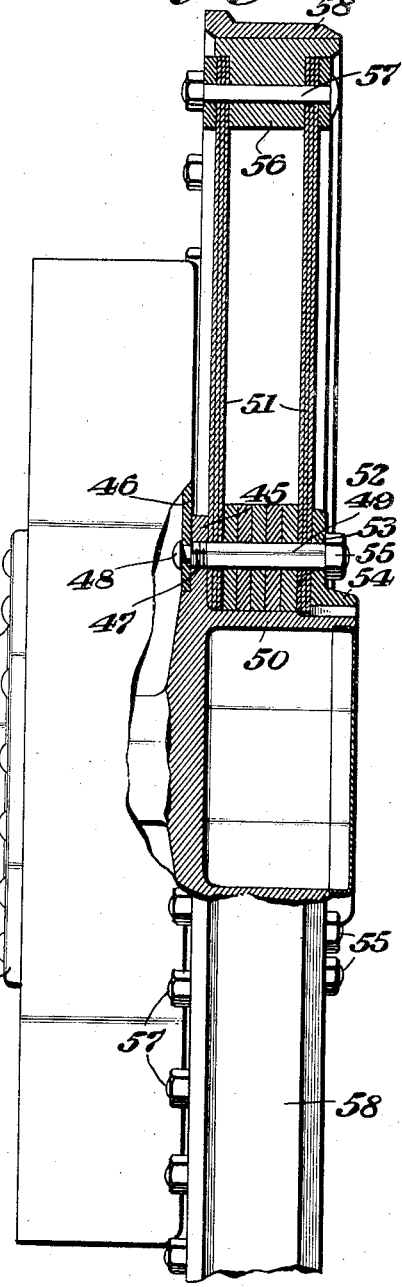

Certain specific embodiments of the invention have been illustrated in the accompanying drawings, in which:

Figure 1 is a sectional view of one end of the driving axle and the wheel mounting, and Fig. 2 is a similar view showing another embodiment of the invention.

In the construction shown in Fig. 1, which will first be described, I have illustrated the invention in connection with a disk wheel and it will be understood that the axle construction and wheel mounting for both ends of the axle or for both axle sections are exactly alike and for this reason one end only of the axle has been illustrated.

The axle section 10 is supported in the usual axle sleeve 11, this sleeve being provided with a laterally extending flange 12 and a longitudinally extending offset portion 13. The usual ball bearing 14 is provided for the outer end of the axle section, the outer ball race 15 being positioned in a recess 16 formed in the portion 13 of the axle section and the inner ball race 17 being positioned between a shoulder formed on the axle section and a nut 19 which is threaded on to a screw threaded portion 20 of the axle section. The ball race is retained in position in the recess 16 by means of a flanged collar or cap 21, this cap being adapted to seat against the outer end of the portion 13 of the axle sleeve and having an inwardly extending portion 22 which is adapted to engage the outer ball race 15 and retain this ball race in position. The cap 21 is secured in place by means of a series of bolts 23, these bolts being headed over as shown at 24 to rigidly connect them with the cap and extending through a portion of the flange 12, nuts 25 being provided for securing the bolts in place.

A dust excluding washer 26 formed of felt or any other suitable material is positioned adjacent the inner end of the cap 21 for the purpose of preventing dust from gaining access to the ball bearing, this washer being inclosed by a flanged collar or ring 27. Oil flingers 28 are provided for the purpose of preventing the escape of oil from the ball bearing, one of these oil flingers coöperating with a flange 29 formed on a portion of the cap 21 and the other flinger coöperating with a flange 30 formed on a collar 31, which is positioned inside of the axle sleeve 11 and adjacent the nut 19.

The ball bearing and axle sleeve construction just described is common to both forms of the invention illustrated and, therefore, a detailed showing of this construction has not been made in Fig. 2.

The wheel mounting for the disk wheel shown in Fig. 1 will next be described.

The axle section 10 is provided at its outer end with an enlarged portion forming an annular recess 32 and a flange 33 extends laterally from this recessed portion. It is often desirable to remove the wheel of a motor vehicle without disturbing the brake drum and for this reason suitable securing means for the brake drum and the wheel has been provided, by means of which the wheel may be moved separately without demounting the brake drum. The brake drum 34 is secured to the flange 33 formed on the axle section by means of a plurality of screw threaded members 35, each of which is preferably headed over, as shown at 36, to rigidly connect the members with the brake drum. Each member 35 is provided with a shoulder 37, which engages the outer surface of the brake drum, the inner surface of the drum being positioned against the flange 33.

An enlarged portion 38 of each member 35 which forms the shoulder 37 is adapted to receive a disk 39 of the disk wheel, this disk being provided with laterally extending annular flange 40, which is adapted to be positioned in the recess 32 of the axle section. A hub cap 41 is positioned over the members 35, which extend outwardly from the enlarged portions 38 and a nut 42 engages the outer screw threaded portion 43 of each member 35 and also engages the cap 41 forcing this cap against the outer surface of the disk 39, thereby retaining the disk in position. The disk 39 has secured to its outer periphery a rim 44 of any suitable construction, this rim being adapted to receive the tire.

In Fig. 2 of my invention, the wheel mounting has been illustrated in connection with the wood veneer type of wheel, the axle section 10 being provided with an outwardly extending flange 45 which corresponds to the flange 33 shown in Fig. 1. The brake drum 46 is secured to the flange 45 by means of a plurality of members 47, each of which is screw threaded into the flange and is headed over as shown at 48. The members 47 are extended as shown at 49 and the wheel is secured to these extensions 49 in the following manner.

The axle section shown in Fig. 2 is extended longitudinally from the flange 45, as illustrated at 50, this extension forming a seat for the inner ends of the disks 51, which in this instance form the body of the wheel. These disks 51 are formed of three-ply veneer and are positioned on the extensions 49 of the securing members 47, a plurality of spacing members or fillers 52 being positioned between the disks 51. These spacing members may also be formed of wood or other suitable material. A flanged ring 53 is positioned on the extensions 49 against the outer surface of the outer disk 51 and is provided with a longitudinally extending portion 54, which is adapted to seat on the extension 51 of the axle section. Nuts 55 are threaded on to the outer ends of the extensions 49 and secure the disks in place thereon. The disks 51 are spaced at their outer ends by means of an annular ring 56, bolts 57 passing through the disks and the ring and retaining the disks thereon. The ring 56 carries a rim 58, which may be secured thereto in any suitable manner and is adapted to receive a tire.

The method of demounting the wheel from the axle section in the two embodiments of the invention shown will now be briefly described.

Referring first to Fig. 1, in order to demount the disk wheel, the nut 42 is first removed, thereby freeing the hub cap 41, after which the disk 39 may be withdrawn longitudinally, the brake drum 34 not being disturbed but being retained in place on the axle section. If the operator then desires to withdraw the axle section from the axle housing, the nuts 25 are removed from the bolts 23, thereby freeing the cap 21 and the axle section may be then withdrawn without disturbing the mounting of the ball bearing on the axle section.

Referring now to Fig. 2, it will be seen that the method of demounting the wood veneer wheel is similar to that just described, it being merely necessary to remove the nuts 55 from the extensions or bolts 49, after which the ring 53 may be withdrawn. The disks 51 and fillers 52 may then be withdrawn longitudinally and, as in the other construction, the brake drum remains secured to the axle section.

While certain specific embodiments of the invention have been illustrated in detail, it should be understood that the invention is capable of further modification and that modifications and changes may be made without departing from the spirit or scope of the invention as expressed in the following claims.

What I claim and desire to secure by Letters Patent is:

1. In combination, an axle, a brake drum, means for securing said brake drum to said axle, a wheel, and means for securing said wheel to said axle in such a manner that the wheel may be demounted from the axle without demounting the brake drum.

2. In combination, an axle having a flanged outer portion, a brake drum, means for securing said brake drum to the flanged portion of said axle, a wheel and means for securing the wheel to the flanged portion of said axle in such a manner that the wheel may be demounted without demounting the brake drum.

3. In combination, an axle having a flanged outer portion, a brake drum, means for securing said brake drum to the flanged portion of said axle, a disk wheel and means for securing the disk of said disk wheel to the flanged portion of said axle in such a manner that the wheel may be demounted from the axle without demounting the brake drum.

4. In combination, an axle having an annular recess in the outer end thereof and a flange extending laterally from said recess, a disk wheel having a flange extending into the recess of said axle, means for securing said wheel to the flange of said axle and means for securing the brake drum to the flange of said axle.

5. In combination, an axle having an annular recess in its outer end and a flange extending laterally from said recess, a brake drum, means for securing said brake drum to said flange, a disk wheel having a flange extending into the recess of said axle, said disk wheel being positioned outside of the brake drum, and means for securing said disk wheel to the flange of said axle.

6. In combination, an axle having a laterally extending flange and a portion extending longitudinally from said flange, a brake drum, means for securing said brake drum to said flange, a wheel positioned on said longitudinally extending portion and means for securing said wheel to said flange.

In testimony whereof I affix my signature.

ORMOND E. HUNT.